(12) United States Patent
Powell

(10) Patent No.: US 6,439,539 B1
(45) Date of Patent: Aug. 27, 2002

(54) ELECTRICALLY CONTROLLABLE VALVE

(75) Inventor: Simon Powell, Baldock (GB)

(73) Assignee: PBT (IP) Ltd, Harlow (GB)

( * ) Notice: Subject to any disclaimer, the term of this patent is extended or adjusted under 35 U.S.C. 154(b) by 0 days.

(21) Appl. No.: 09/701,322

(22) PCT Filed: May 27, 1999

(86) PCT No.: PCT/GB99/01686
§ 371 (c)(1),
(2), (4) Date: Dec. 18, 2000

(87) PCT Pub. No.: WO99/61827
PCT Pub. Date: Dec. 2, 1999

(30) Foreign Application Priority Data

May 27, 1998 (GB) ................................................. 9811398

(51) Int. Cl.⁷ ...................... F16K 25/00; F16K 31/02; F16K 3/00; F16K 31/44
(52) U.S. Cl. ...................... 251/87; 251/84; 251/129.06; 251/326; 251/279; 251/901
(58) Field of Search ................................ 251/326, 332, 251/318, 319, 129.06, 84, 87, 279, 901, 11; 137/625.64; 60/527, 528

(56) References Cited

U.S. PATENT DOCUMENTS

| 1,063,019 | A | * | 5/1913 | Delaney | |
|---|---|---|---|---|---|
| 1,192,141 | A | * | 7/1916 | White | |
| 3,152,612 | A | | 10/1964 | Avery | |
| 4,149,505 | A | * | 4/1979 | Zeeman | 123/139 |
| 4,158,368 | A | * | 6/1979 | Clark | 137/487 |
| 4,404,502 | A | * | 9/1983 | Magori et al. | 318/116 |
| 4,730,806 | A | | 3/1988 | Krasnov | |
| 5,148,735 | A | | 9/1992 | Veletovac | |
| 6,149,139 | A | * | 11/2000 | Holderle | 261/35 |

FOREIGN PATENT DOCUMENTS

| DE | 29 18 377 A | 11/1980 |
|---|---|---|
| EP | 0 450 078 A | 10/1981 |

OTHER PUBLICATIONS

Patent Abstracts of Japan, vol. 12, No. 073 (M–674), Mar. 8, 1988, and Japanese Patent Publication No. 62–215176 A, NOK Corp., Sep. 21, 1987.

* cited by examiner

Primary Examiner—Henry C. Yuen
Assistant Examiner—David A Bonderer
(74) Attorney, Agent, or Firm—Rankin, Hill, Porter & Clark LLP

(57) ABSTRACT

An electrically controllable valve comprising at least one input port (13) and one or more output ports (12, 14), at least one sealing means (17, 18) being arranged to control the flow of a fluid between said input port and at least one of said output ports, said valve comprises one or more piezo-electric actuators (26) arranged to control the state of said sealing means, whereby the flow of fluid through said valve may be electrically controlled.

11 Claims, 2 Drawing Sheets

ELECTRICALLY CONTROLLABLE VALVE

TECHNICAL FIELD

The present invention relates to a valve for controlling a fluid flow and more particularly to a valve with an integral piezo-electric actuator arranged to control the operation of the valve.

PRIOR ART

Valves and spool valves are well known for controlling fluid flow, and many different designs and arrangements are well known in the art. Furthermore, electrically controlled valves are also known controlled by a solenoid to directly open or close the fluid path, or to control a diaphragm or iris to block the valve bore. However, even with such solenoid valves, there is still a further need for a valve which can be easily constructed and readily controlled by an electrical control circuit.

SUMMARY OF THE INVENTION

It is an object of the present invention to integrate a piezo-electric actuator into a valve to provide a readily electrically controllable valve for the control of a fluid flow.

In order to meet the above object, according to the present invention there is provided an electrically controllable valve comprising at least one input port and one or more output ports, at least one sealing means being arranged to control the flow of a fluid between said input port and at least one of said output ports, said valve being characterised by further comprising one or more piezo-electric actuators arranged to control the state of said sealing means, whereby the flow of fluid through said valve may be electrically controlled.

In a first embodiment, the valve may further comprise a valve rod arranged to move within a bore, the valve rod having a first and a second sealing member disposed at respective fixed positions thereon such that in one position the sealing members cause fluid to flow from the input port to the first output port, and in a second position the sealing members cause the fluid to flow from the input port to a second output port. In addition, a spring means arranged to bias the valve rod into the first position may also be provided, and a pilot hole arranged to vent fluid from within the hole to the opposite side of one of the sealing members is also provided and arranged to be opened or closed by means of the piezo-electric actuator. When the pilot hole is open, fluid is free to flow from within the bore to the opposite side of one of the sealing members thereby forcing the valve rod into the second position. In this way, the piezo-electric actuator may control the position of the valve rod and hence the state of the valve.

Furthermore, in the above first embodiment, the valve may further include a pilot channel arranged between one end of the bore and the pilot hole through which the fluid may flow when said pilot hole is open, the pilot channel being further provided with an exhaust port arranged to be closed when the pilot hole is opened and vice versa. The exhaust port may be closed by operation of the first piezo-electric actuator, or by operation of a second piezo-electric actuator.

Alternatively to the above, in a second embodiment of the present invention the valve may further comprise a slidable sheet provided with a hole extending from one side to the other, the sheet being arranged transverse to a bore having the inlet port at one end and the outlet port at the other, and being further arranged to slide in the transverse plane in response to actuation of the piezo-electric actuator. This operation may control the valve such that in a first mode of operation the sheet is held such that the hole is not within the bore whereby the valve is then deemed closed, and in a second mode of operation the sheet is moved such that the hole is within the bore whereby the valve is then open, and fluid may flow from the input port to the output port.

In this second embodiment, a second piezo-electric actuator may also be provided arranged to complement the action of the first piezo actuator so that, for example, the first piezo actuator is arranged to push the sheet along the transverse plane, while the second piezo actuator pulls the sheet, and vice versa. The sheet is preferably made of a substantially friction-less material such as, for example, polytetrafluoro-ethene.

In either of the above-described arrangements, the fluid is preferably a pressurised gas.

BRIEF DESCRIPTION OF THE DRAWINGS

In order that the present invention be more readily understood a number of preferred embodiments thereof will now be described, presented by way of example only, and with reference to the accompanying drawings in which.

DESCRIPTION OF THE PREFERRED EMBODIMENTS

Figure 1:
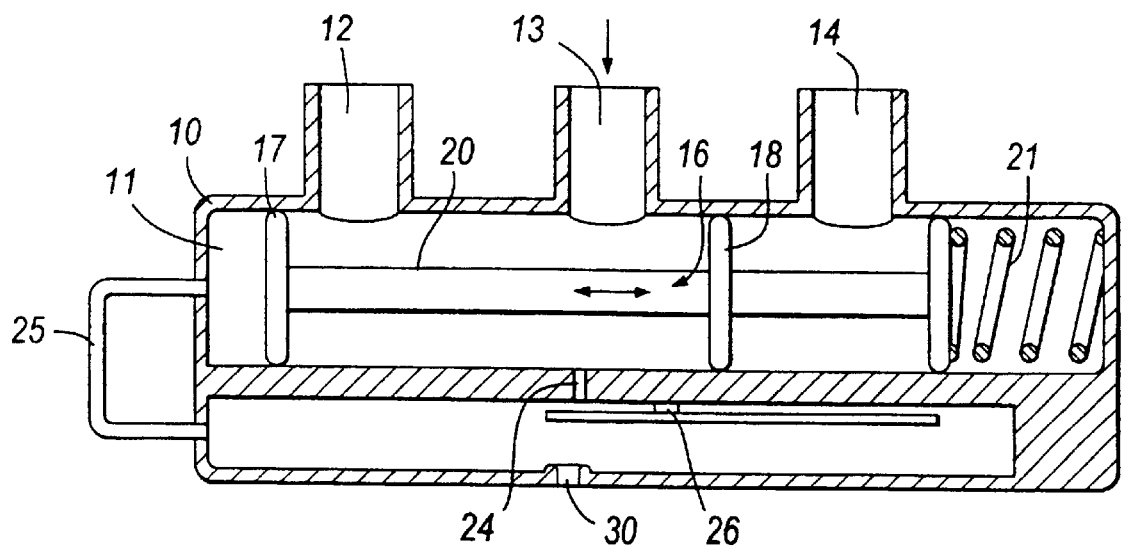
FIG. 1 shows a diagrammatic sectional side view of a spool valve according to a first embodiment of the present invention.

A first embodiment of a valve according to the present invention will now be described with reference to FIG. 1. Herein, a spool valve has a main body (10) provided with a main bore (11). Along the bore (11) are provided a number of fluid ports (12, 13 and 14) for the ingress and egress of fluid into and from the valve. Within the bore (11) there is provided a valve member (16) having two sealing surfaces (17 and 18) spaced apart by an appropriate distance by means of a rod (20) and biased to one end of the bore (11) by means of a spring (21).

Movement of the valve member (16) is achieved by varying the pressure on either side of one or other of the sealing members (17,18) and control of the pressures is effected by controlling flow of fluid through a pilot hole (24) in the wall of the main casing (10). In this embodiment the control of the opening and closing of the pilot hole is achieved by means of a piezo electric arrangement (26) mounted on the spool valve. An example arrangement which facilitates the opening or closing of the pilot hole by means of a piezo-electric actuator will be described in more detail later.

The exact form of the piezo electric arrangement used is dependent on the exact size and space permitted by the design of the valve but could be of the form shown in our co-pending International Application PCT/GB98/0670 which produced controlled motion in two directions.

A simple operation of the spool valve of the present embodiment will now be described in order to aid understanding of the invention. Let us assume that fluid port (13)

is an inlet for pressurized gas. With the valve member (16) in the position shown in the drawing, the sealing members (17 and 18) cause pressurized gas entering via port (13) to exit the valve via the port (12). This assumes that the pilot hole (24) is closed.

If the piezo-electric arrangement (26) is now activated so as to uncover the pilot hole (24), this movement also seals the exhaust port (30) and so pressurized gas can flow through the pilot hole (24), into the pilot channel (25) and through the pilot channel to the other side of the sealing member (17) to move the valve member (16) against the spring (21) thereby compressing the spring (21). The movement of the valve rod against the spring continues until the sealing member (17) is in a position between the outlet port (12) and inlet port (13) such that the outlet port (12) is closed, and whereupon the sealing member (18) has opened the port (14) and pressurized fluid flow occurs from the inlet (13) to the outlet (14). The spring (21) must be of sufficient compressibility to permit the resultant force generated by the pressurised fluid acting on both sides of the sealing member (17) to move the valve rod to compress the spring.

When the piezo electric actuator is reset the pilot hole (24) is closed which results in the pressure in the pilot channel E being exhausted to atmosphere through the exhaust port (30) and the valve member (16) returning to its initial position shown in the drawing under the action of the spring (21).

It may be possible to arrange a single piezo-electric actuator to both open the pilot hole and close the exhaust port simultaneously as described above, or alternatively it may be possible to have two separate piezo-electric actuators acting in a complementary fashion to achieve the required functions.

Figure 3A:
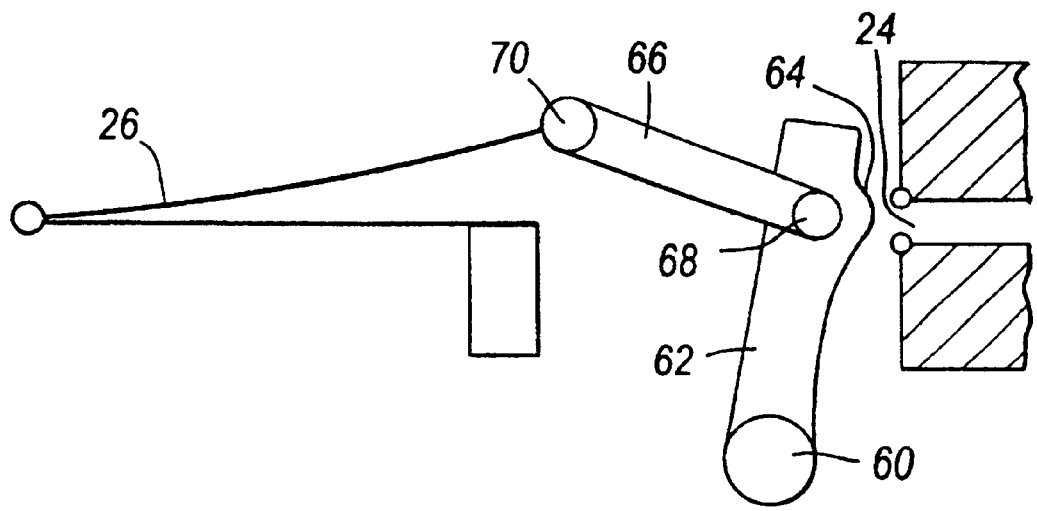
FIG. 3. shows a diagrammatic representation of a piezo-electric hole closure mechanism which may be used with the first embodiment of the present invention.

An example arrangement of a mechanism in which a piezo-electric actuator is used to open and close a pilot hole and which may be used in the above described first embodiment of the present invention will now be described with reference to FIGS. 3(a) and (b).

In FIG. 3, a first arm member 62 is arranged to rotate about a first fixed pivot 60. The arm member 62 has a sealing protrusion 64 provided on one surface thereon and arranged in facing relation to the pilot hole 24. The piezo-electric actuator 26 comprises a first leg and a second leg arranged in a hairpin configuration. Upon energisation, the first leg and second leg are forced apart or brought together as required, and depending upon the orientation of the piezo-electric ceramic layers disposed upon the legs of the actuator. The construction of such an actuator is described more fully in our co-pending International application referenced earlier and also in our British Patent Application No. 9811399.6

Figure 3B:
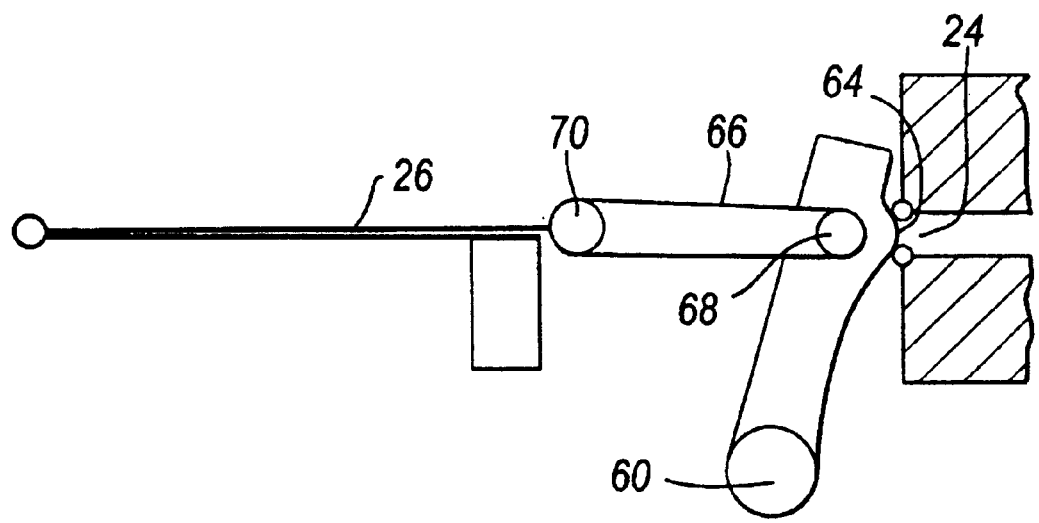

A first leg of the actuator is fastened to a fixed structure, and the second leg of the actuator is attached to a second arm member 66 by a movable pivot 70. The other end of the second arm member 66 is attached to the first arm member 62 by a second pivot 68. FIG. 3(a) shows the situation where the actuator 26 is in such a state that the pilot hole 24 is open. In order to close the pilot hole, the actuator 26 is energised or de-energised as required, and depending upon the configuration of the actuator itself, such that the second leg of the actuator attached to the second arm member 66 is brought into contact with the first leg member thus forcing the first arm member 62 to rotate forwards about the pivot 60 such that the sealing protrusion 64 engages into the pilot hole 24 thereby closing the pilot hole. An appropriate seal may be provided around the pilot hole as required in order to ensure an adequate gas seal. The situation where the pilot hole is closed by the sealing protrusion is shown in FIG. 3(b).

It will be appreciated that the above-described pilot hole sealing mechanism is presented by way of example only, and that other such mechanism using a piezo-electric actuator will be apparent to those skilled in the art, and which may be employed within the first embodiment of the present invention. Furthermore, it will also be apparent that the above-described mechanism is suitable for sealing one hole only, and that therefore two of such mechanisms would be required to open and close the pilot hole and the exhaust port respectively, or that the mechanism would need to be modified in order to achieve both of these functions simultaneously.

A second embodiment of a valve according to the present invention will now be described with reference to FIG. 2.

Figure 2:
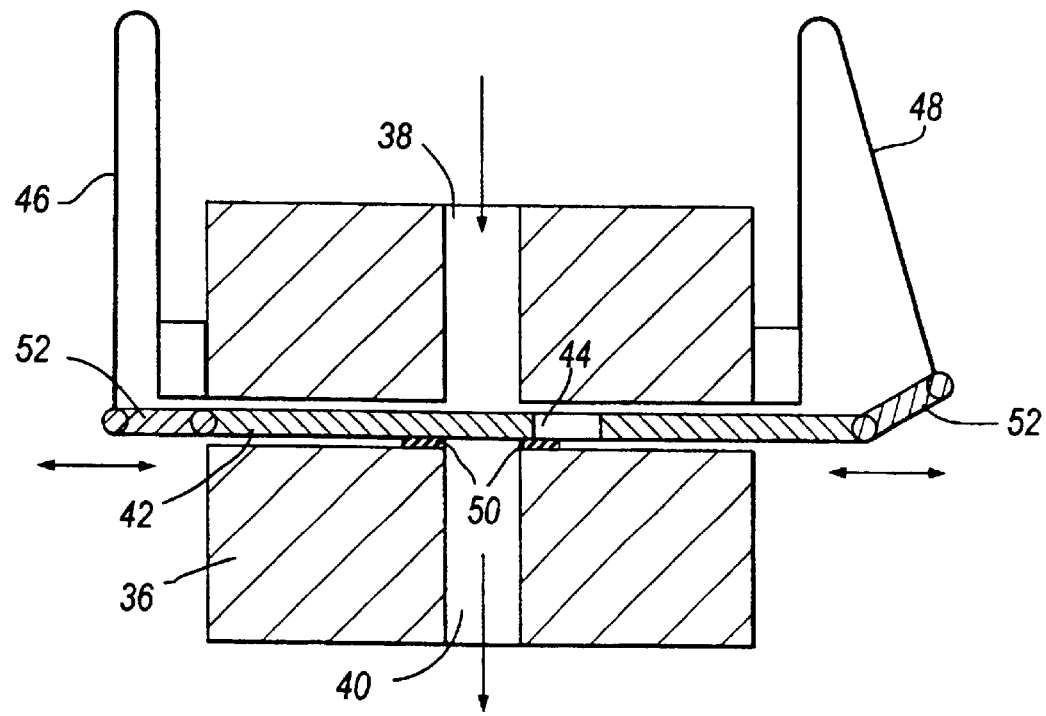
FIG. 2 shows a diagrammatic cross-section of a valve according to a second embodiment of the present invention.

In FIG. 2, a casing 36 is provided with a bore having an inlet port 38 and an outlet port 40 through which fluid may flow. A slidable sheet 42 is provided arranged to slide in a slot in the casing 36 transverse to the bore such that the sheet cuts across the bore in order to seal the bore and prevent fluid from flowing from the input port to the output port. The slidable sheet 42 is provided with a hole 44 extending therethrough, the hole being positioned such that in a first position of the slidable sheet the hole is contained within the transverse slot in the casing such that no fluid may pass through the hole, and in a second position of the slidable sheet a hole is placed within the bore to allow fluid to flow from the input port 38 through the hole to the output port 40. In order to move the slidable sheet from the first closed position to the second open position, two piezo actuators 46 and 48 are provided fastened to the casing 36 such that one of the actuators is at each end of the sheet 42. The actuators are arranged to act upon the respective ends of the sheet 42 by virtue of link arms 52 pivoted between the ends of the sheet and the actuating arms of the actuators. Finally, a seal 50 may be provided in the transverse slot in the casing 36 through which the slidable sheet slides, arranged around the bore in order to seal the bore when the sheet is in the closed position.

The two piezo-electric actuators 46 and 48 are arranged to act upon the sheet in a complimentary fashion such that one of the actuators pulls its respective end of the sheet via the link arm 52 while the other actuator pushes the opposite end of the sheet via its respective link arm, and vice versa. In this way, the piezo actuators may directly act upon the sheet to move the sheet from the first closed position to the second open position, thereby controlling the state of the valve and hence the flow of fluid through the valve.

The slidable sheet is preferably made from a substantially friction-less material such as, for example, polytetrafluoroethene, although other fluoro plastics may also be used, such as, for example, those sold under the trade name of Penton. Moreover, where a seal 50 is employed around the bore to seal the slidable sheet with the casing 36, the seal is also preferably made from a substantially friction free material such as those mentioned earlier.

It will be appreciated that the exact design of a valve according to the present invention can be modified as desired, and that the two specific embodiments described above are presented by way of non-limiting example only. For example, a much more complicated valve could be designed as could a much simpler valve. The main thrust of this invention is that the valve can be opened and closed, or otherwise controlled, by means of a piezo electric device, and other arrangements which satisfy such a criteria will be apparent to those skilled in the art without departing from the scope of the present invention.

What is claimed is:

1. An electrically controllable valve comprising
at least one input port;
at least one output port;
at least one sealing means arranged to control the flow of a fluid between said input port and said output port; and
first and second piezo-electric actuators arranged to control the state of said sealing means whereby the flow of fluid through said valve may be electrically controlled;
said sealing means comprising a slidable sheet provided with a hole extending therethrough, said sheet being arranged to slide in a direction transverse to a bore having said inlet port at one end and said outlet port at the other end, and being further arranged to slide in the transverse plane in response to the piezo-electric actuators, wherein in a first mode of operation of said actuators the sheet is held such that the hole is not within said bore whereby said valve is closed, and in a second mode of operation of said actuators the sheet is held such that the hole is within said bore whereby said valve is open, said piezo-electric actuators being arranged to complement each other such that said first piezo-electric actuator is arranged to pull said sheet and said second electric actuator is arranged to push said sheet.

2. An electrically controllable valve according to claim 1, wherein said sheet is made of substantially frictionless material.

3. An electrically controllable valve according to claim 2, wherein said material is polytetrafluoroethene.

4. An electrically controllable valve according to claim 3, and further comprising a substantially frictionless seal provided within said bore arranged to contact with the surface of said sheet in order to prevent fluid flow through said bore.

5. An electrically controllable valve according to claim 4, wherein said fluid is a pressurized gas.

6. An electrically controllable valve according to claim 2, and further comprising a substantially frictionless seal provided within said bore arranged to contact with the surface of said sheet in order to prevent fluid flow through said bore.

7. An electrically controllable valve according to claim 6, wherein said fluid is a pressurized gas.

8. An electrically controllable valve according to claim 2, wherein said fluid is a pressurized gas.

9. An electrically controllable valve according to claim 1, and further comprising a substantially frictionless seal provided within said bore arranged to contact with the surface of said sheet in order to prevent fluid flow through said bore.

10. An electrically controllable valve according to claim 9, wherein said fluid is a pressurized gas.

11. An electrically controllable valve according to claim 1, wherein said fluid is a pressurized gas.

* * * * *